(12) United States Patent
Yuan

(10) Patent No.: US 10,586,314 B2
(45) Date of Patent: Mar. 10, 2020

(54) IMAGE FUSION METHOD, APPARATUS, AND INFRARED THERMAL IMAGING DEVICE

(71) Applicant: SHENZHEN EVERBEST MACHINERY INDUSTRY CO., LTD., Shenzhen (CN)

(72) Inventor: Jianmin Yuan, Shenzhen (CN)

(73) Assignee: Shenzhen Everbest Machinery Industry Co., LTD (CN)

( * ) Notice: Subject to any disclaimer, the term of this patent is extended or adjusted under 35 U.S.C. 154(b) by 0 days.

(21) Appl. No.: 15/569,031

(22) PCT Filed: Apr. 12, 2016

(86) PCT No.: PCT/CN2016/079015
§ 371 (c)(1),
(2) Date: Oct. 24, 2017

(87) PCT Pub. No.: WO2017/177370
PCT Pub. Date: Oct. 19, 2017

(65) Prior Publication Data
US 2019/0026875 A1  Jan. 24, 2019

(51) Int. Cl.
*G06T 5/50* (2006.01)
*G06T 5/00* (2006.01)

(52) U.S. Cl.
CPC ............... *G06T 5/50* (2013.01); *G06T 5/009* (2013.01); *G06T 2207/10024* (2013.01);
(Continued)

(58) Field of Classification Search
CPC .. G06T 5/50; G06T 5/009; G06T 2207/10048
See application file for complete search history.

(56) References Cited

U.S. PATENT DOCUMENTS 7,620,265 B1* 11/2009 Wolff ........................ G06T 5/50
382/254
7,652,251 B1* 1/2010 King ..................... G02B 23/12
250/332

(Continued)

FOREIGN PATENT DOCUMENTS

CN       101510007 A     8/2009
CN       104822033 A     8/2015
(Continued)

OTHER PUBLICATIONS

WIPO, International Search Report in English, dated Oct. 19, 2017 (2 Pages).
(Continued)

*Primary Examiner* — Santiago Garcia
(74) *Attorney, Agent, or Firm* — Mark Malek; Widerman Malek PL

(57) ABSTRACT

An image fusion method, apparatus, and an infrared thermal imaging device, in which the method includes: acquiring a visible image and an infrared thermogram using the same scale at the same field of view; calculating a fusion ratio for each frame of the infrared thermograms; and performing a gray value fusion to each frame of the infrared thermograms and a corresponding frame of the visible images according to the fusion ratio.

16 Claims, 4 Drawing Sheets

(52) U.S. Cl.
CPC ............... *G06T 2207/10048* (2013.01); *G06T 2207/20021* (2013.01); *G06T 2207/20221* (2013.01)

(56) References Cited

U.S. PATENT DOCUMENTS

| | | | | |
|---|---|---|---|---|
| 2011/0069175 | A1* | 3/2011 | Mistretta | G06T 5/50 348/164 |
| 2013/0162834 | A1* | 6/2013 | Wang | G06T 5/009 348/164 |
| 2013/0188058 | A1* | 7/2013 | Nguyen | G01J 5/02 348/164 |
| 2014/0270562 | A1* | 9/2014 | Neal | G06T 5/002 382/254 |
| 2015/0055886 | A1* | 2/2015 | Oh | G06T 3/4038 382/284 |
| 2015/0244946 | A1* | 8/2015 | Agaian | H04N 5/33 348/164 |
| 2016/0071289 | A1* | 3/2016 | Kobayashi | G06T 5/50 382/167 |
| 2016/0262638 | A1* | 9/2016 | Kamada | A61B 5/0071 |
| 2017/0061663 | A1* | 3/2017 | Johnson | G06T 11/60 |
| 2018/0228447 | A1* | 8/2018 | Arai | A61B 5/00 |
| 2018/0335380 | A1* | 11/2018 | Schmidt | H04N 5/23258 |

FOREIGN PATENT DOCUMENTS

| | | |
|---|---|---|
| CN | 105354851 A | 2/2016 |
| CN | 105447838 A | 3/2016 |
| WO | WO 2017/177370 A1 | 10/2017 |

OTHER PUBLICATIONS

WIPO, Written Opinion in Chinese, dated Oct. 19, 2017, previously submitted to the USPTO. (3 Pages).

* cited by examiner

IMAGE FUSION METHOD, APPARATUS, AND INFRARED THERMAL IMAGING DEVICE

CROSS REFERENCE TO RELATED APPLICATIONS

This is a national stage application under 35 U.S.C. § 371 of PCT patent application PCT/CN2016/079015, filed on Apr. 12, 2016, which is incorporated herein by reference in its entirety.

FIELD OF THE INVENTION

The present disclosure relates to the field of image processing, and particularly relates to an image fusion method, apparatus, and an infrared thermal imaging device.

BACKGROUND OF THE INVENTION

An infrared thermal imaging device uses an infrared detector and an image-forming optical lens to receive an energy distribution pattern of infrared radiation emitted by a detected target object, and reflects the received energy distribution pattern of infrared radiation to a light-sensitive element of the infrared detector, thus obtaining an infrared thermogram. The infrared thermogram corresponds to the thermal distribution of the object. In other words, the infrared thermal imaging device reflects invisible infrared energy emitted by the object as visible infrared thermograms. Different colors of the infrared thermogram represent different temperatures of the detected object. The infrared thermal imaging device displays the differences between the temperatures of the object, but when the surface temperature of the object is close to or equal to the ambient temperature, the object cannot be identified. Therefore, generally a visible light sensor would be attached to an advanced infrared thermal imaging device to assist the infrared thermal imaging device to identify the target object when the temperature differences are small.

Although the prior art can perform an image fusion enhancement using the visible light sensor, a visible image will still be superposed on the infrared thermogram when the infrared thermogram is relatively clear, which may cause loss of details of the infrared thermogram. In addition, it is necessary to continually manually adjust the fusion ratio in different scenes in order to accurately identify the target object when using conventional image fusion methods, which is complicated to operate, and requires operators to have enough professional knowledge, thus it is not conducive to the intelligence and popularity of the infrared thermal imaging device.

SUMMARY OF THE INVENTION

Accordingly, it is necessary to provide an image fusion method, apparatus, and an infrared thermal imaging device, which have less loss of details of an infrared thermogram.

An image fusion method includes: acquiring a visible image and an infrared thermogram using the same scale at the same field of view; calculating a fusion ratio for each frame of the infrared thermograms; and performing a gray value fusion to each frame of the infrared thermograms and a corresponding frame of the visible images according to the fusion ratio.

An infrared thermal imaging device includes: at least one memory storing instructions, and at least one processor that executes the instructions to: acquiring a visible image and an infrared thermogram using the same scale at the same field of view; calculating a fusion ratio for each frame of the infrared thermograms; and performing a gray value fusion to each frame of the infrared thermograms and a corresponding frame of the visible images according to the fusion ratio.

An image fusion apparatus includes: an acquisition module configured to acquire a visible image and an infrared thermogram using the same scale at the same field of view; a calculation module configured to calculate a fusion ratio for each frame of the infrared thermograms; and a fusion module configured to perform a gray value fusion to each frame of the infrared thermograms and a corresponding frame of the visible images according to the fusion ratio.

The aforementioned image fusion method, apparatus, and infrared thermal imaging device calculate a fusion ratio for each frame of the infrared thermograms, and thus can automatically identify temperature differences between a target object and the environment during a whole image acquisition process. It takes advantage of the complementation between the infrared thermograms and the visible images to the most degree, therefore it can automatically calculate a fusion ratio for an infrared-visible image when the temperature differences are small or the infrared thermograms are not clear, so that to the most degree the details of the target object are expressed.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items.

As used in this application, the term "module" is intended to refer to a computer-related entity, either hardware, a combination of hardware and software, software, or software in execution.

Figure 1:
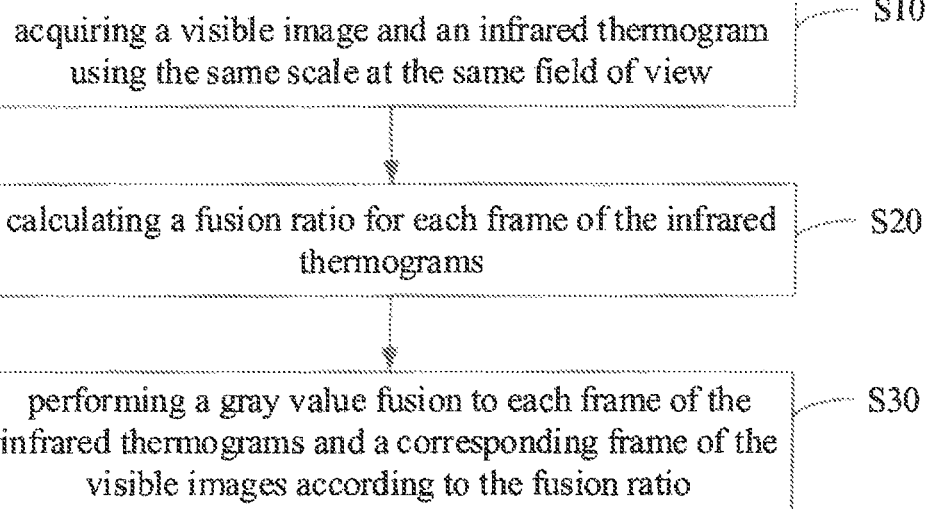
FIG. 1 is a flow chart of an image fusion method performed by an infrared thermal imaging device according to an embodiment.
Figure 6:
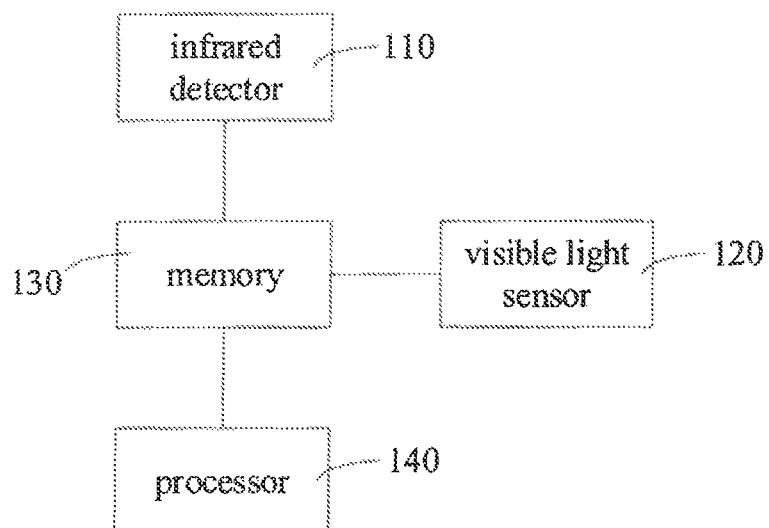
FIG. 6 is a block diagram of an infrared thermal imaging device according to an embodiment.

FIG. 1 is a flow chart illustrating an image fusion method performed by an infrared thermal imaging device according to an embodiment. The method is performed by aforementioned infrared thermal imaging device. Specifically, as shown in FIG. 6, the infrared thermal imaging device includes at least one processor 140 (e.g. an image processor), at least one memory 130 storing instructions, a visible light sensor 120, and an infrared detector 110. The following steps of the method are performed by the cooperation of the processor 140, the memory 130, the visible light sensor 120, and the infrared detector 110:

In step S10: the visible light sensor 120 (e.g. a camera) and the infrared detector 110 acquire a visible image and an infrared thermogram using the same scale at the same field of view, respectively, that is to say, each frame of the visible images is in one-to-one correspondence with each frame of the infrared thermograms. Then the visible light sensor 120 and the infrared detector 110 store the acquired visible image and infrared thermogram in memory 130. In addition, the memory 130 stores instructions for performing image fusion.

In step S20: the processor 140 reads the instructions from the memory 130 to perform calculation of a fusion ratio for each frame of the infrared thermograms. In other words, the processor 140 calculates a corresponding fusion ratio for each frame of the infrared thermograms, and thus the fusion ratio is dynamic by frame.

In step S30: next, according to the fusion ratio of each frame of the infrared thermograms, the processor 140 performs a gray value fusion to each frame of the infrared thermograms and a corresponding frame of the visible images. In other words, during the image fusion, the processor 140 adjusts the gray values of the pixel points in the infrared thermogram and the visible image according to the fusion ratio. Therefore, it can automatically identify temperature differences between a target object and the environment, and it takes advantage of the complementation between the infrared thermogram and the visible image to the most degree, therefore it can automatically calculate a fusion ratio for an infrared-visible image when the temperature differences are small or the infrared thermograms are not clear, so that to the most degree the details of the target object are expressed.

Figure 2:
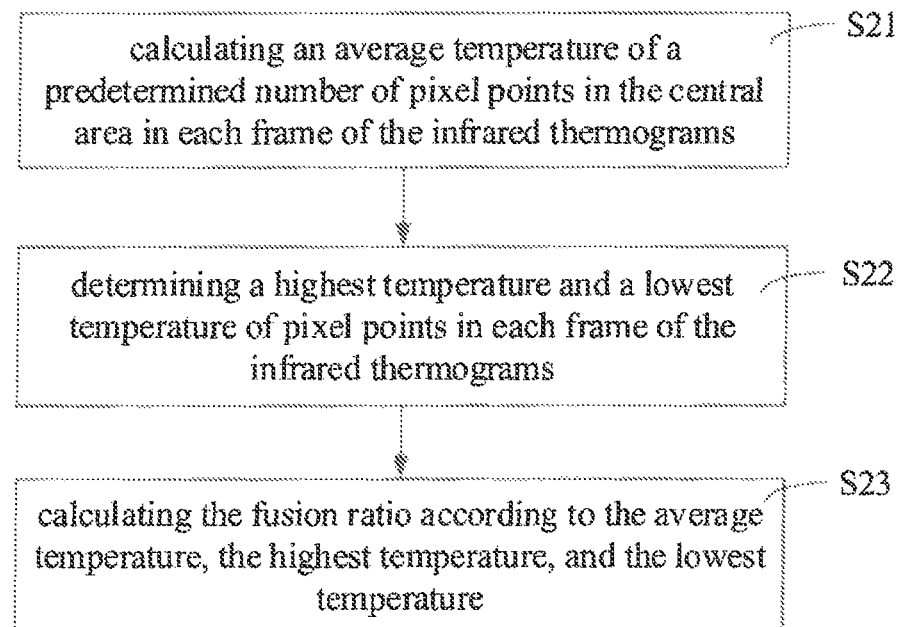
FIG. 2 is a flow chart illustrating the step shown in FIG. 1 of calculating a fusion ratio for each frame of infrared thermograms.

As shown in FIG. 2, the processor 140 reads the instructions from the memory 130 to perform the following steps so as to complete step S20:

In step S21: the processor 140 calculates an average temperature of a predetermined number of pixel points in a reference area in each frame of the infrared thermograms. The reference area can be anywhere in each frame of the infrared thermograms. In one embodiment, the reference area is the central area of the rectangular image frame. In other words, the number of the selected pixel points in the reference area can be adjusted according to the actual needs. The predetermined number of pixel points can be fixed as preset, or can be dynamic during the image fusion process. In one embodiment, pixel points in the central rectangular area can be selected, i.e., a×b pixel points, in which a and b are both positive integer.

In step S22: next, the processor 140 determines a highest temperature and a lowest temperature of pixel points in each frame of the infrared thermograms.

In step S23: Then the processor 140 calculates the fusion ratio of each frame of the infrared thermograms according to the average temperature $T_1$, the highest temperature $T_{max}$, and the lowest temperature $T_{min}$. In other words, the fusion ratio of each frame of the infrared thermograms is calculated based on the average temperature $T_1$, the highest temperature $T_{max}$, and the lowest temperature $T_{min}$. In one embodiment, the fusion ratio is associated to an absolute value of a difference between the highest temperature $T_{max}$ and the average temperature $T_1$, i.e., $\Box T_1 = |T_1 - _{max}|$, and is associated to an absolute value of a difference between the lowest temperature $T_{min}$ and the average temperature $T_1$, i.e., $\Box T_2 = |T_1 - T_{min}|$.

Figure 3:
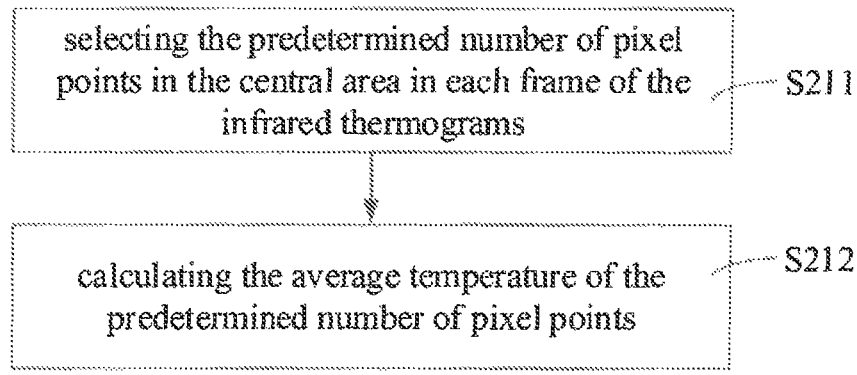
FIG. 3 is a flow chart illustrating the step shown in FIG. 2 of calculating an average temperature of a predetermined number of pixel points in a reference area in each frame of the infrared thermograms.

As shown in FIG. 3, the processor 140 reads the instructions from the memory 130 to perform the following steps so as to complete step S21:

In step S211: the processor 140 selects the predetermined number of pixel points in the reference area in each frame of the infrared thermograms. In other words, the processor 140 selects a fixed number of the pixel points for each frame of the infrared thermograms, or selects different numbers of the pixel points for different frame of the infrared thermograms.

In step S212: the processor 140 calculates the average temperature of the predetermined number of pixel points after the number of the pixel points being determined.

Figure 4:
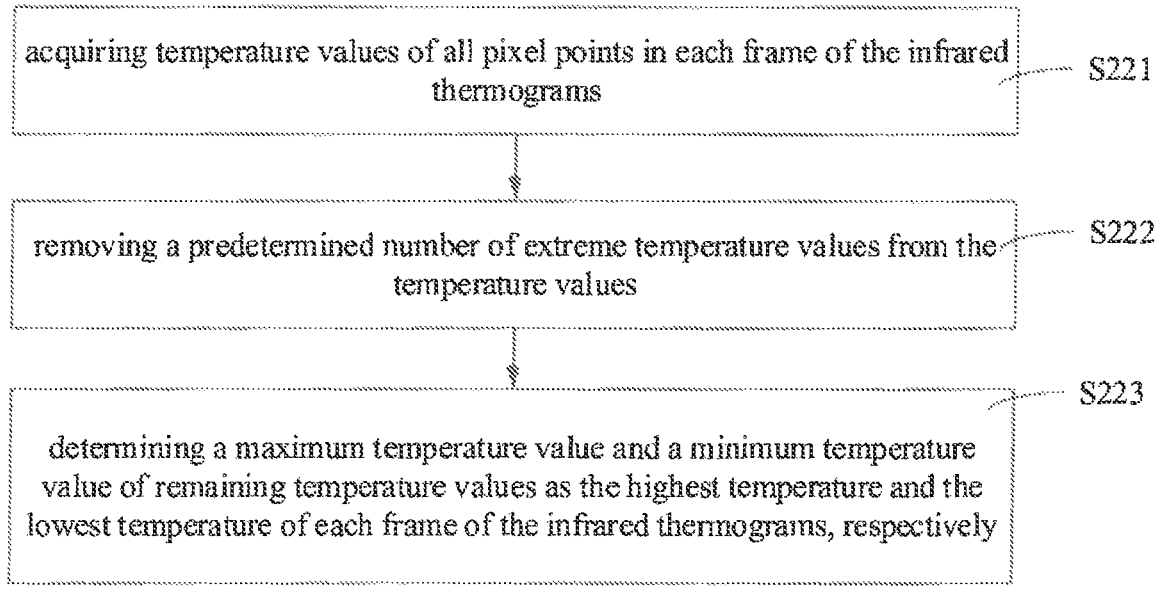
FIG. 4 is a flow chart illustrating the step shown in FIG. 2 of determining a highest temperature and a lowest temperature of pixel points in each frame of the infrared thermograms.

As shown in FIG. 4, the processor 140 reads the instructions from the memory 130 to perform the following steps so as to complete step S22:

In step S221: the processor 140 acquires temperature values of all pixel points in each frame of the infrared thermograms.

In step S222: then the processor 140 removes a predetermined number of extreme temperature values from the acquired temperature values. In other words, the processor 140 removes some extreme values at both ends of the statistical temperature values. For example, the processor 140 sorts the temperature values from high to low according to the actual situation, and then removes 10 high temperature values starting from the highest temperature and 10 low temperature values starting from the lowest temperature. Thus pixel points in the infrared thermogram which are not intended to observe can be removed. For example, a high temperature pixel point corresponding to a burning cigarette end, or low temperature pixel points corresponding to ice cubes in iced drinks.

In step S223: the processor 140 determines the maximum temperature value and the minimum temperature value of the remaining temperature values as the highest temperature $T_{max}$ and the lowest temperature $T_{min}$ of each frame of the infrared thermograms, respectively.

Figure 5:
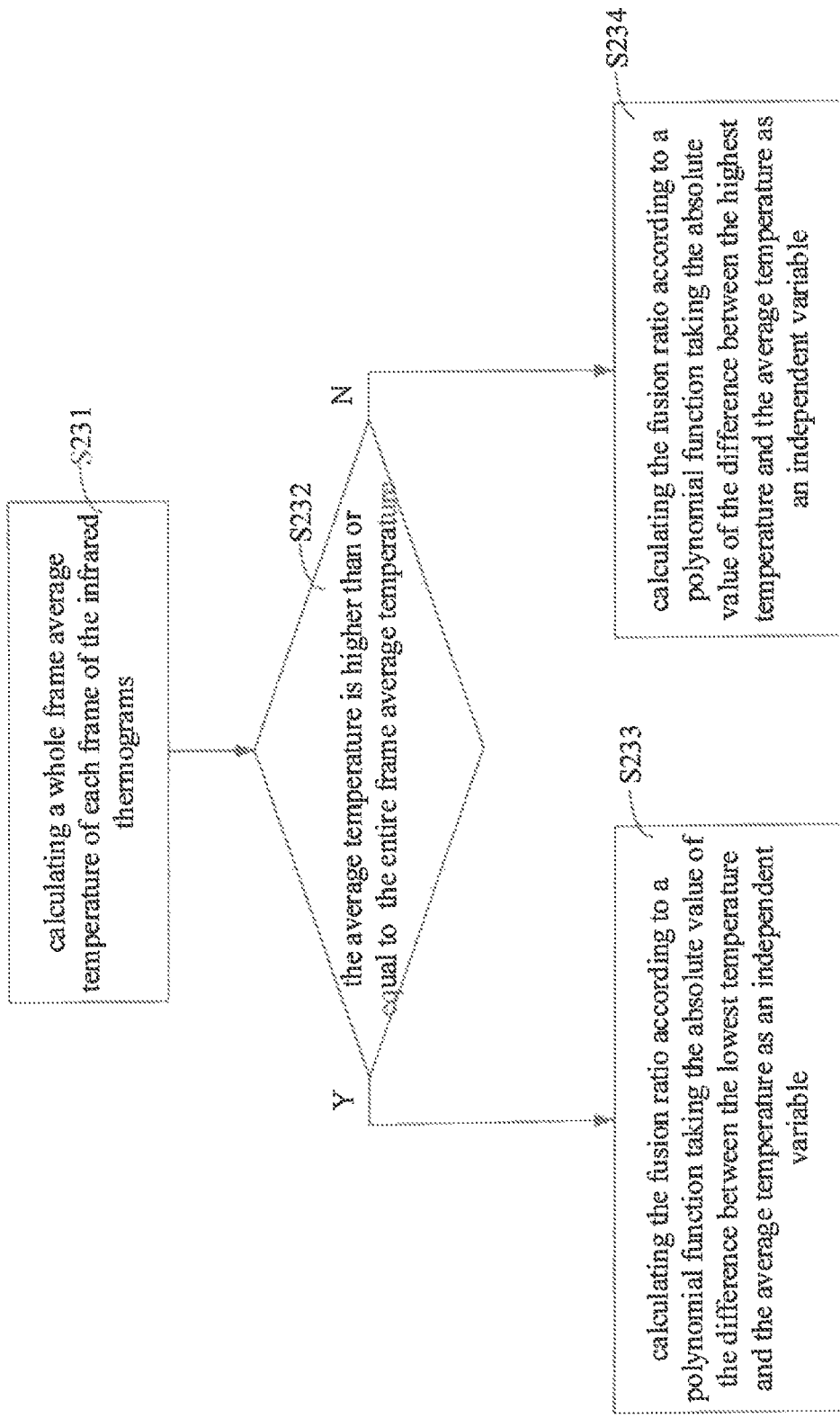
FIG. 5 is a flow chart illustrating the step shown in FIG. 2 of calculating the fusion ratio according to the average temperature, the highest temperature and the lowest temperature.

As shown in FIG. 5, the processor 140 reads the instructions from the memory 130 to perform the following steps so as to complete step S23:

In step S231: the processor 140 calculates a whole frame average temperature $T_{avg}$ of each frame of the infrared thermograms.

In step S232: the processor 140 determines whether or not the average temperature $T_1$ is higher than or equal to the whole frame average temperature $T_{avg}$.

In step S233: if so, i.e., the average temperature $T_1$ is higher than or equal to the whole frame average temperature $T_{avg}$, calculating the fusion ratio Y according to a polynomial function taking the absolute value $\Box T_2$ of the difference between the lowest temperature $T_{min}$ and the average temperature $T_1$ as an independent variable.

In step S234: if not, i.e., the average temperature $T_1$ is lower than the whole frame average temperature $T_{avg}$, calculating the fusion ratio Y according to a polynomial function taking the absolute value $T_1$ of the difference between the highest temperature $T_{max}$ and the average temperature $T_1$ as an independent variable. In other words, the processor 140 dynamically chooses independent variable for the same polynomial function according to the average temperature $T_1$, the highest temperature $T_{max}$, the lowest temperature $T_{min}$, and the whole frame average temperature $T_{avg}$. In one embodiment, the polynomial function is a cubic polynomial function.

In one embodiment, the processor 140 calculates a fusion factor F according to a cubic polynomial function which is:

$$F=0.00000005702 \times T^3 - 0.0009722 \times T^2 + 0.5705 \times T + 147.5.$$

Then divide the fusion factor F by a predefined coefficient to obtain the fusion ratio Y. For example, the predefined coefficient can be chosen as binary integer 256 or 1024, i.e., Y=F/256 or Y=F/1024. After obtaining the fusion ratio Y, the processor 140 adjusts ratio of the gray values of the pixel points in the infrared thermogram and the visible image according to the fusion ratio Y, and fuses the infrared thermogram and the visible image, thus it can automatically identify temperature differences between a target object and the environment during the whole image acquisition process, and it takes advantage of the complementation between the infrared thermogram and the visible image to the most degree, therefore it can automatically calculate a fusion ratio for an infrared-visible image when the temperature differences are small or the infrared thermograms are not clear, so that to the most degree the details of the target object are expressed. In an embodiment, when the reference area in one frame of the infrared thermograms represents a bottle of hot water, and temperature of the hot water is much higher than the whole frame average temperature, if the predefined coefficient is 256 at this time, then the fusion factor F can be calculated as being 256, finally the fusion ratio Y can be calculated as being 1, i.e., it should all be the infrared thermogram. In an embodiment, when the reference area in one frame of the infrared thermograms represents an arm of a human, and temperature of the arm is a bit higher than the whole frame average temperature, if the predefined coefficient is 256 at this time, then the fusion factor F can be calculated as being 180, finally the fusion ratio Y can be calculated as being 0.7. In an embodiment, when the reference area in one frame of the infrared thermograms represents a book, and temperature of the book is close to the ambient temperature, if the predefined coefficient is 256 at this time, then the fusion factor F can be calculated as being 130, finally the fusion ratio Y can be calculated as being 0.5.

Figure 7:
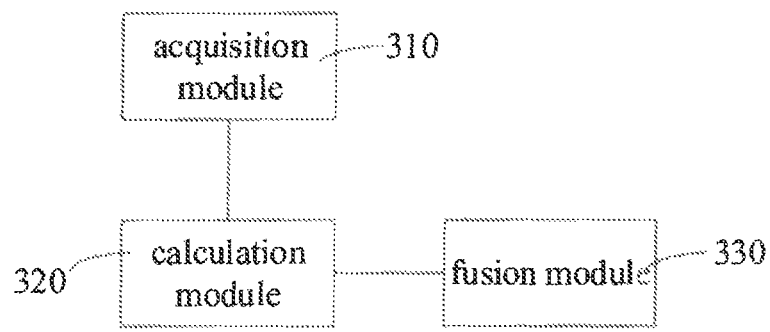
FIG. 7 is a block diagram of an image fusion apparatus according to an embodiment.

FIG. 7 is a block diagram illustrating an image fusion apparatus according to an embodiment. The image fusion apparatus includes an acquisition module 310, a calculation module 320, and a fusion module 330. In which the acquisition module 310 acquires a visible image and an infrared thermogram using the same scale at the same field of view; the calculation module calculates a fusion ratio for each frame of the infrared thermograms; the fusion module performs a gray value fusion to each frame of the infrared thermograms and a corresponding frame of the visible images according to the calculated fusion ratio.

In an embodiment, the calculation module 320 is further configured to calculate an average temperature of a predetermined number of pixel points in a reference area in each frame of the infrared thermograms; determine a highest temperature and a lowest temperature of pixel points in each frame of the infrared thermograms; and calculate the fusion ratio of each frame of the infrared thermograms according to the average temperature, the highest temperature, and the lowest temperature.

In an embodiment, the calculation module 320 is further configured to select the predetermined number of pixel points in the reference area in each frame of the infrared thermograms; and calculate the average temperature of the predetermined number of pixel points.

In an embodiment, the calculation module 320 is further configured to acquire temperature values of all pixel points in each frame of the infrared thermograms; remove a predetermined number of extreme temperature values from the temperature values; and determine a maximum temperature value and a minimum temperature value of remaining temperature values as the highest temperature and the lowest temperature of each frame of the infrared thermograms, respectively.

In an embodiment, the calculation module 320 is further configured to calculate a whole frame average temperature of each frame of the infrared thermograms; calculate the fusion ratio according to a polynomial function taking the absolute value of the difference between the highest temperature and the average temperature as an independent variable when the average temperature is higher than or equal to the whole frame average temperature; and calculate the fusion ratio according to a polynomial function taking the absolute value of the difference between the lowest temperature and the average temperature as an independent variable when the average temperature is lower than the whole frame average temperature.

In an embodiment, the calculation module 320 is further configured to calculate a fusion factor according to the polynomial function; and divide the fusion factor by a predefined coefficient to obtain the fusion ratio. The predefined coefficient is 256 or 1024.

The cubic polynomial function is:

$$F=0.00000005702 \times T^3 - 0.0009722 \times T^2 + 0.5705 \times T + 147.5,$$

in which F is the fusion factor, and T is the independent variable.

Those of ordinary skill in the art may understand that all or a part of the steps of the foregoing method embodiments may be implemented by a program instructing relevant hardware. The aforementioned program may be stored in a computer readable storage medium. When the program is executed, the steps of the foregoing method embodiments are performed. The storage medium may include any medium capable of storing program code, such as a ROM, a RAM, a magnetic disk, or an optical disc.

Although the disclosure is illustrated and described herein with reference to specific embodiments, the disclosure is not intended to be limited to the details shown. Rather, various modifications may be made in the details within the scope and range of equivalents of the claims and without departing from the disclosure. Therefore, the scope of the present disclosure shall be defined by the appended claims.

What is claimed is:

1. An image fusion method, comprising:
   acquiring a visible image and an infrared thermogram using a same scale at a same field of view;
   calculating a fusion ratio for each frame of the infrared thermogram, the step of calculating the fusion ratio comprising:
   calculating an average temperature of a predetermined number of pixel points in a reference area in each frame of the infrared thermogram;
   determining a highest temperature and a lowest temperature of the pixel points in each frame of the infrared thermogram; and
   calculating the fusion ratio of each frame of the infrared thermogram according to the average temperature, the highest temperature, and the lowest temperature; and
   performing a gray value fusion to each frame of the infrared thermogram and a corresponding frame of the visible image according to the fusion ratio;
   wherein the fusion ratio is associated to an absolute value of a difference between the highest temperature and the average temperature and is associated to an absolute value of a difference between the lowest temperature and the average temperature.

2. The method of claim 1, wherein calculating the average temperature of the predetermined number of pixel points in the reference area in each frame of the infrared thermogram comprises:
   selecting the predetermined number of pixel points in the reference area in each frame of the infrared thermogram; and
   calculating the average temperature of the predetermined number of pixel points.

3. The method of claim 1, wherein determining the highest temperature and the lowest temperature of pixel points in each frame of the infrared thermogram comprises:
   acquiring temperature values of all pixel points in each frame of the infrared thermogram;
   removing a predetermined number of extreme temperature values from the temperature values; and
   determining the maximum temperature value and the minimum temperature value of remaining temperature values as the highest temperature and the lowest temperature of each frame of the infrared thermogram, respectively.

4. The method of claim 1, wherein calculating the fusion ratio of each frame of the infrared thermogram according to the average temperature, the highest temperature, and the lowest temperature comprises:
   calculating a whole frame average temperature of each frame of the infrared thermogram;
   calculating the fusion ratio according to a polynomial function taking the absolute value of the difference between the highest temperature and the average temperature as an independent variable when the average temperature is higher than or equal to the whole frame average temperature; and
   calculating the fusion ratio according to a polynomial function taking the absolute value of the difference between the lowest temperature and the average temperature as an independent variable when the average temperature is lower than the whole frame average temperature.

5. The method of claim 4, wherein calculating the fusion ratio according to the polynomial function comprises:
   calculating a fusion factor according to the polynomial function; and
   dividing the fusion factor by a predefined coefficient to obtain the fusion ratio.

6. The method of claim 5, wherein the predefined coefficient is 256 or 1024.

7. The method of claim 4, wherein the polynomial function is a cubic polynomial function.

8. The method of claim 7, wherein the cubic polynomial function is:

$$F=0.00000005702 \times T^3 - 0.0009722 \times T^2 + 0.5705 \times T + 147.5$$

wherein F is the fusion factor, and T is the independent variable.

9. An image fusion apparatus, comprising:
   an acquisition module configured to acquire a visible image and an infrared thermogram using a same scale at a same field of view;
   a calculation module configured to calculate:
   a fusion ratio for each frame of the infrared thermogram,
   an average temperature of a predetermined number of pixel points in a reference area in each frame of the infrared thermogram determine a highest temperature and a lowest temperature of pixel points in each frame of the infrared thermogram,
   the fusion ratio of each frame of the infrared thermogram according to the average temperature, the highest temperature, and the lowest temperature,
   a whole frame average temperature of each frame of the infrared thermogram;
   the fusion ratio according to a polynomial function taking an absolute value of a difference between the highest temperature and the average temperature as an independent variable when the average temperature is higher than or equal to the whole frame average temperature, and
   the fusion ratio according to a polynomial function taking an absolute value of a difference between the lowest temperature and the average temperature as an independent variable when the average temperature is lower than the whole frame average temperature; and
   a fusion module configured to perform a gray value fusion to each frame of the infrared thermogram and a corresponding frame of the visible image according to the fusion ratio.

10. The apparatus of claim 9, wherein the calculation module is further configured to select the predetermined number of pixel points in the reference area in each frame of the infrared thermogram; and calculate the average temperature of the predetermined number of pixel points.

11. The apparatus of claim 9, wherein the calculation module is further configured to acquire temperature values of all pixel points in each frame of the infrared thermogram; remove a predetermined number of extreme temperature values from the temperature values; and determine a maximum temperature value and a minimum temperature value of remaining temperature values as the highest temperature and the lowest temperature of each frame of the infrared thermogram, respectively.

12. The apparatus of claim 9, wherein the calculation module is further configured to calculate a fusion factor according to the polynomial function; and divide the fusion factor by a predefined coefficient to obtain the fusion ratio.

13. The apparatus of claim 12, wherein the predefined coefficient is 256 or 1024.

14. The apparatus of claim 12, wherein the polynomial function is a cubic polynomial function.

15. The apparatus of claim 14, wherein the cubic polynomial function is:

$$F=0.00000005702 \times T^3 - 0.0009722 \times T^2 + 0.5705 \times T + 147.5$$

wherein F is the fusion factor, and T is the independent variable.

16. An infrared thermal imaging device, comprising:
at least one memory storing instructions; and
at least one processor that executes the instructions to:
    acquire a visible image and an infrared thermogram using a same scale at a same field of view;
    calculate a fusion ratio for each frame of the infrared thermogram; and
    perform a gray value fusion to each frame of the infrared thermogram and a corresponding frame of the visible image according to the fusion ratio;
wherein calculating the fusion ratio comprises:
    calculating an average temperature of a predetermined number of pixel points in a reference area in each frame of the infrared thermogram,
    determining a highest temperature and a lowest temperature of the pixel points in each frame of the infrared thermogram, and
    calculating the fusion ratio of each frame of the infrared thermogram according to the average temperature, the highest temperature, and the lowest temperature; and
wherein the fusion ratio is associated to an absolute value of a difference between the highest temperature and the average temperature and is associated to an absolute value of a difference between the lowest temperature and the average temperature.

* * * * *